United States Patent [19]

Carageorge

[11] Patent Number: 4,814,580
[45] Date of Patent: Mar. 21, 1989

[54] THERMAL WALKWAY

[76] Inventor: Gregory T. Carageorge, 963 Highland View, NE., Atlanta, Ga. 30306

[21] Appl. No.: 179,237

[22] Filed: Apr. 8, 1988

[51] Int. Cl.⁴ ............................................. H05B 3/28
[52] U.S. Cl. ................................... 219/213; 219/245; 219/378
[58] Field of Search ............... 219/213, 345, 522, 548, 219/378

[56] References Cited

U.S. PATENT DOCUMENTS

| | | | |
|---|---|---|---|
| 1,142,771 | 6/1915 | Hadaway, Jr. | 219/213 |
| 1,874,778 | 8/1932 | Mayer | 219/213 |
| 2,521,540 | 9/1950 | Richardson | 219/213 |
| 2,540,295 | 2/1951 | Schreiber | 219/213 |
| 2,762,896 | 9/1956 | Pendleton | 219/213 |
| 2,844,696 | 7/1958 | Custer | 219/345 |
| 3,236,991 | 2/1966 | Graham et al. | 219/213 |
| 3,260,835 | 7/1966 | Soukey | 219/213 |
| 3,418,448 | 12/1968 | Pradenas | 219/213 |
| 4,274,396 | 6/1981 | Peters | 126/438 |
| 4,292,500 | 9/1981 | Semanaz | 219/213 |
| 4,311,898 | 1/1982 | McMillan | 219/365 |
| 4,469,087 | 9/1984 | Cameron | 126/422 |
| 4,564,745 | 1/1986 | Deschenes | 219/213 |

FOREIGN PATENT DOCUMENTS

| | | | |
|---|---|---|---|
| 2202164 | 8/1973 | Fed. Rep. of Germany | 219/213 |
| 2244157 | 3/1974 | Fed. Rep. of Germany | 219/213 |
| 3300891 | 7/1984 | Fed. Rep. of Germany | 219/345 |
| 55-33560 | 3/1980 | Japan | 219/213 |
| 1034723 | 7/1966 | United Kingdom | 219/213 |

Primary Examiner—Teresa J. Walberg
Attorney, Agent, or Firm—Thomas & Kennedy

[57] ABSTRACT

A thermal walkway brick has a heating element embedded therein and electrically connected at each end to couplers mounted to opposite sides of the brick. One of the couplers is a female element that defines a channel and the other coupler is a male element having a tongue. The female element is constructed and oriented to receive the tongue of the male element of a brick of the same construction with the bricks arranged in side-by-side spaced relationship. A set of bricks is laid together to form a thermal walkway with the heating elements of adjacent bricks electrically coupled in series circuit by the couplers. The spaces between adjacent bricks are filled with mortar to complete the walkway and encapsulate the couplers. The bricks are heated by the heating elements upon application of voltage to prevent a buildup or to melt ice and snow on the walkway.

13 Claims, 2 Drawing Sheets

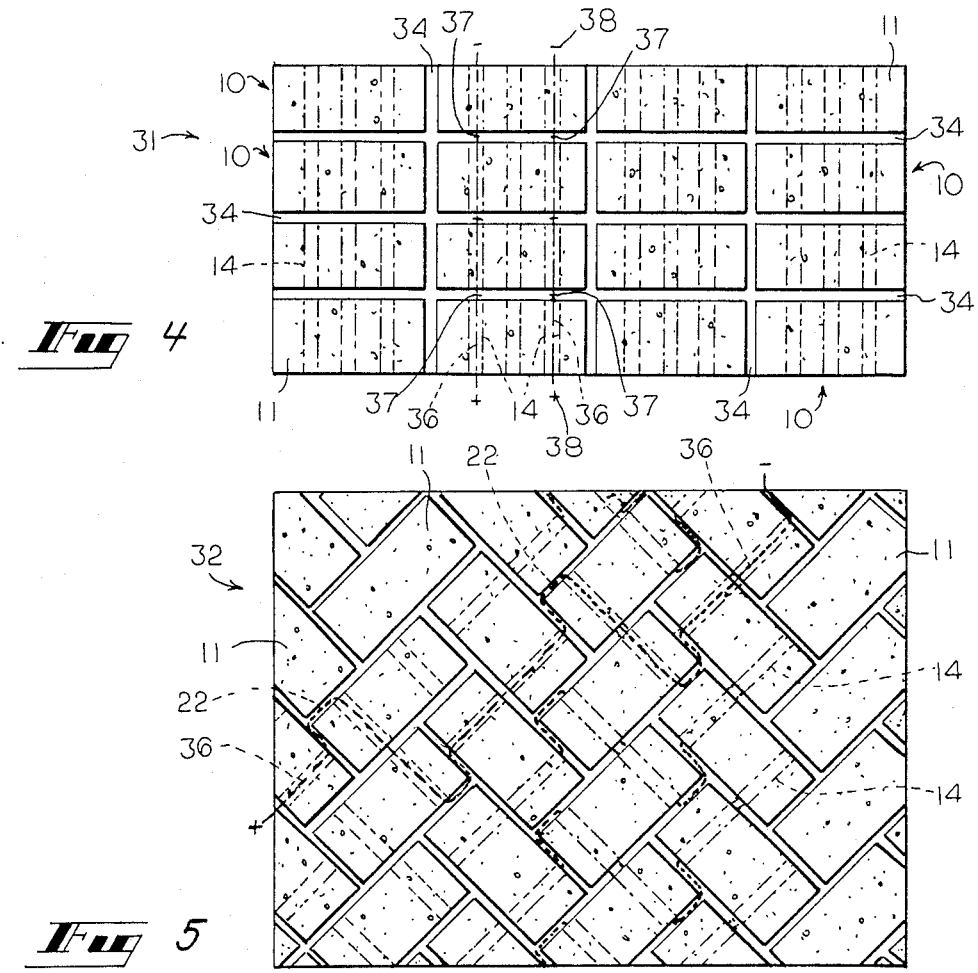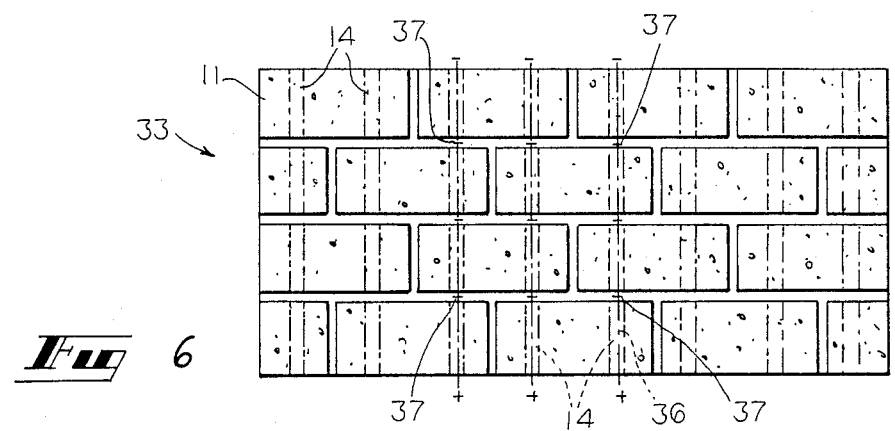

THERMAL WALKWAY

FIELD OF THE INVENTION

The present invention relates to heated walkways and particularly to heated walkways constructed from individual bricks having electrical heating elements embedded therein.

BACKGROUND OF THE INVENTION

Masonry sidewalks and walkways constructed from individual masonry units or bricks have become increasingly popular in recent years, particularly in and around office complexes and shopping centers. The accumulation of snow and ice on such walkways, however, can be dangerous for pedestrians using the walkways. This is particularly true in northern latitudes where snow and ice can remain on the ground for long periods of time.

Traditional methods of snow and ice removal from walkways have included the use of shovels or snow-blowing equipment as well as salt and gravel spread on the walkways to melt and break up the ice. These methods are not completely satisfactory because they are labor intensive and snow and ice can reaccumulate on the walkways in a short time requiring further removal. In addition, salt and gravel spread on walkways tends to create a dirty and unsightly slush that can also require manual cleaning.

Attempts have been made to provide driveways and walkways that are electrically heated so that snow and ice accumulating on the walkway is melted and does not become a safety hazard. Examples of such attempts are illustrated in U.S. Pat. Nos. 3,236,991, 3,418,448 and 4,564,745. The devices illustrated here tend to be large, heavy and difficult to manage, and are usually designed to be embedded within a concrete or asphalt walkway. They are ill suited for use with masonry walkways of the type constructed of individual bricks arranged in a selected pattern.

Thus, it is seen that a need has long existed for a heated masonry walkway that overcomes the just described problems. It is to the provision of such a walkway and of a brick from which it can be constructed that the present invention is primarily directed.

SUMMARY OF THE INVENTION

A brick is now provided for use in constructing a masonry walkway of the type in which a set of bricks is arranged in mutually spaced relationship into a selected pattern. Each of the bricks has at least one elongated electrical heating element embedded therein which extends from one side of the brick to another. A male coupler is mounted adjacent one side of the brick and is electrically connected to one end of the heating element. A female couplers is mounted adjacent the other side of the brick and are electrically connected to the other end of the heating element.

The couplers are electrically conductive and the male couplers of each brick are constructed and arranged to align and couple with the female couplers of an adjacent brick when the bricks are arranged in the spaced pattern defining the walkway. An electrical heating circuit comprising the interconnected heating elements within individual bricks is thus formed within the walkway when the bricks are arranged with their coupling means coupled together. The word "circuit" as used herein refers to a number of heating elements coupled together in series by their couplers for connection to a power source.

The space between adjacent bricks is filled with mortar to encapsulate and protect the couplers means while providing a walkway of conventional appearance. The heating elements are heated in response to the application of voltage to the circuit defined within the walkway. This heat is thermally conducted to the bricks and to their exposed upper surfaces such that snow and ice accumulating on the walkway is melted quickly to prevent its buildup.

Thus, a heated masonry walkway and brick for constructing same is provided with the brick being small, light, easy to handle and inexpensive to produce, particularly since bricks are conventionally formed with channels that can accommodate the heating elements. At least some of the bricks in the walkway contain at least one heating element and couplers arranged to couple adjacent bricks together while electrically connecting their individual heating elements to define a series of heating circuits within the walkway. The couplers may not only provide electrical connection of the heating elements, but also help to ensure precise alignment and spacing of the bricks in the walkway as it is being formed and mortared.

Upon construction of the walkway, the spaces between the bricks are preferably filled with mortar to form an integral, solid walkway while simultaneously encapsulating and protecting the couplers between adjacent bricks. For use, voltage is applied to the ends of each series circuit thereby heating the heating elements and, consequently, heating individual bricks in the walkway.

BRIEF DESCRIPTION OF THE DRAWINGS

FIG. 4 is a plan view of one embodiment of a walkway according to the present invention.

FIG. 5 is a plan view of a second embodiment of a walkway according to the present invention.

FIG. 6 is a plan view of a third embodiment of a walkway according to the present invention.

DETAILED DESCRIPTION

Figure 1:
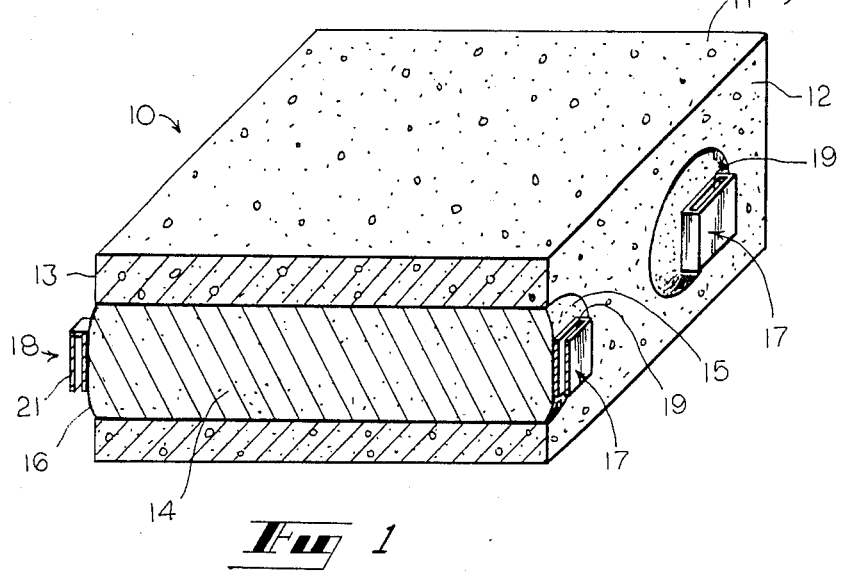
FIG. 1 is a perspective view, in cross-section, of a brick that embodies the concept of the present invention.
Figure 2:
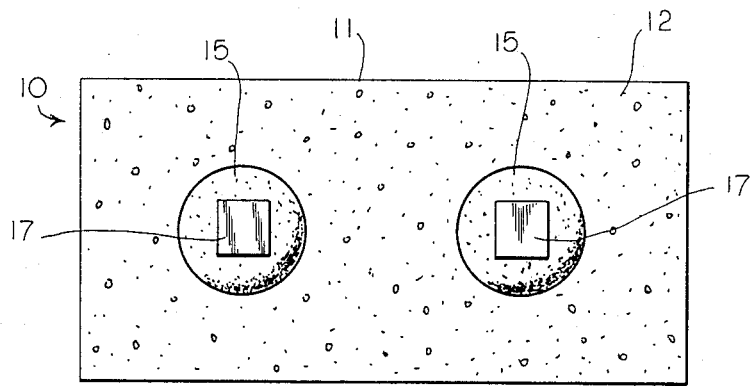
FIG. 2 is a side elevational view of the brick shown in FIG. 1.

Referring now in more detail to the drawings, in which like numerals represent like parts throughout the several views, FIGS. 1 and 2 show a brick 10 embodying principles of the present invention. The brick 10 is of conventional rectangular block shape and has a top 11, a first side 12 and a second side 13 with the second side 13 located opposite to and parallel with the first side 12. A pair of heating elements 14 are embedded within the brick 10 and extend in spaced, parallel relationship relative to each other from the first side 12 to the second side 13. The heating elements 14 are preferably formed from commonly available resistive heating material such as that used in household ovens and the like. The heating elements 14 have first end portions 15 that extend here slightly beyond the surface of the first side 12. Similarly, end portions 16 of the heating elements 14 extend slightly beyond the surface of the second side 13, as shown in FIG. 1.

Mounted to each end portion 15 of the two heating elements 14 adjacent the first side 12 is a female coupler 17. A male coupler 18 is mounted to each end portion 16 adjacent side 13. The couplers 17 and 18 are constructed of electrically conducting material such as stainless steel or copper and are electrically connected as well as physically mounted to the end portions of the heating elements.

In the embodiment of FIG. 1, each male coupler 18 has a generally inverted U-shaped cross section forming a downwardly extending tongue 21 spaced from the end portion 16 of the heating elements 14. Female coupling means 17 defines a vertically oriented slot 19 that is sized and shaped to receive the tongue 21 of a male coupler 18 mounted to an adjacent brick of the same construction. Thus, with this arrangement, linear series of bricks can be positioned in mutually spaced relationship with the male coupler of each brick coupled with the female coupler of an adjacent brick. In this way the heating elements 14 of several bricks 10 are electrically connected in series to form an electrical heating circuit within the walkway formed by the bricks. The couplers also serve as spacers so that the bricks 10 are uniformly spaced and arranged in their selected pattern with the sides of adjacent bricks spaced apart to accept mortar therebetween.

FIG. 4 illustrates one example of a walkway that can be constructed from the bricks of FIGS. 1 and 2. The bricks 10 are seen to be arranged in mutually spaced longitudinal and lateral alignment forming a masonry pattern known in the industry as "jack-on-jack". The heating elements 14 are schematically seen here to be axially aligned with their couplers aligned and coupled together in the space between adjacent bricks, as generally indicated at 37. A plurality of mechanical and electrically parallel circuits 36 are partially defined by the ganged heating elements 14. The exposed couplers along the two sides of the walkway are connected to two unshown buses across which a voltage may be supplied. When this is done, the heating elements in each circuit are heated which, in turn, heats the bricks 10 preventing or melting an accumulation of ice and snow on the surface of the walkway.

FIG. 6 shows the bricks 10 arranged in a masonry pattern known as the "running bond" pattern. In this pattern, the bricks in each row are longitudinally offset from the bricks in adjacent rows a distance substantially equal to the spacing between the heating elements. With this arrangement, alternate heating elements align and are coupled together at their ends as schematically indicated at 37. As in the embodiment of FIG. 4, this arrangement defines a plurality of electrical circuit elements 36 extending within the walkway such that the heating elements can be heated upon application of voltage to the end couplers 38 of each set of ganged heaters.

In both the embodiments of FIG. 4 and FIG. 6, the spaces 34 between adjacent bricks are preferably filled with mortar. The mortar creates the appearance of a standard brick walkway and, simultaneously, encapsulates the coupling means between the bricks such that they are protected from corrosion and wear.

Figure 3:
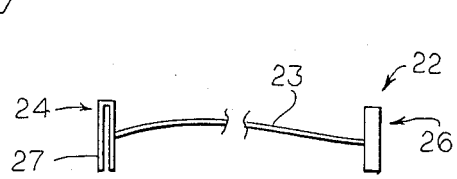
FIG. 3 is a side elevational view of an extension cable that can be used to connect the end portions of heating elements together electrically.

A third embodiment of a walkway constructed with the bricks of FIG. 1 is shown in FIG. 5. Here the bricks are arranged in a "herringbone" pattern commonly used with brick walkways. With the bricks 10 arranged in a herringbone pattern, the heating elements 14 are not axially aligned as in the other patterns. In order to establish an electrical circuit within a herringbone walkway, the extension cable 22 shown in FIG. 3 is used. Extension cable 22 comprises a flexible conductor 23 attached at one end to a male coupler 24 and at its other end to a female coupler 26. Male coupler 24 has a downwardly extending tongue 27. The female coupler 26 is configured to receive and couple with a male coupler 18 of a brick and the male coupler 24 is likewise adapted to couple with a female coupler of a brick.

As shown in FIG. 5, extension cables 22 are coupled to the end portions of non-aligned heating elements and their conductors 23 are placed in the spaces between the bricks. In this way, a set of meandering electrical circuit segments are provided in the walkway by the interconnected heating elements and extension cables such that each heating element in the circuit may be heated upon application of a voltage.

It is thus seen that a thermal walkway and brick element thereof is now provided which provides distinct improvements over those of the prior art. While the present invention has been described in terms of preferred embodiments, it should be understood that many additions, deletions and modifications can be made thereto without departing from the spirit and scope of the invention as set forth in the claims.

What is claimed is:

1. A thermal walkway brick having two substantially flat brick sides and at least one elongated electrical heating element embedded therein with end portions of said heating element located adjacent said two brick sides;

means for spacing said brick a predetermined distance from adjacent bricks in the walkway including male and female coupling means, said male comprising means extending outwardly from one of said flat brick sides and electrically connected to one end of said heating element;

said female coupling means extending outwardly from another of said flat brick sides and electrically connected to the other end of said heating element;

said male and female coupling means being electrically conductive with the male coupling means oriented to couple with the female coupling means of another one of said bricks causing said brick to be spaced said predetermined distance from adjacent bricks in the walkway, with the bricks arranged in side-by-side space arrangement;

whereby a plurality of bricks of said construction can be arranged in mutually spaced relationship to form a walkway with the coupling means of each brick coupled to coupling means of an adjacent brick so that an electrical circuit may be formed in the walkway.

2. The brick of claim 1 wherein said brick is generally parallelpiped having a substantially rectangular top and bottom, substantially rectangular opposing sides and substantially rectangular opposing ends, and wherein at least two heating elements are embedded within said brick with said heating elements extending in spaced substantially parallel relationship relative to each other between said opposing brick sides with said heating element ends located beyond said sides, and wherein a first set of coupling means is mounted to the ends of one heating element and a second set of coupling means is mounted to the ends of the other heating element.

3. The brick of claim 2 wherein said male coupling means includes a tongue and each of said female coupling means defines a slot sized and shaped to receive said tongue 4. A thermal walkway brick having at least one elongated electrical heating element embedded therein and electrically connected at each end to coupling means protruding from the exterior of the brick at two sides thereof, and wherein one of said coupling means comprises a female channel that extends generally parallel to one of said brick sides and wherein the other of said coupling means comprises a male element that extends generally parallel to the other of said brick sides and to said female channel, and means for spacing said bricks a specified distance apart, said spacing means comprising said protruding coupling means, whereby a plurality of bricks of said construction may be laid together to form a thermal walkway with adjacent bricks electrically coupled in series circuit by said exterior coupling means that may be embedded by mortar formed between the bricks.

5. A heated walkway comprising a set of bricks arranged in mutually spaced, side-by-side relationship with each of said bricks having upright sides;
   at least some of said bricks having an elongated electrical heating element embedded therein with opposing ends located adjacent opposite sides of the brick;
   means for spacing said bricks with heating elements a predetermined distance from each other including a male coupling means and a female coupling means;
   said male coupling means extending outwardly from one of said opposite sides of each of said bricks and being electrically connected to one end of said heating element;
   said female coupling means extending outwardly from the other of said sides of each of said bricks with said female coupling means being electrically connected to the other end of said heating element and wherein some of said male coupling means of some of said bricks are connected to said female coupling means of other of said bricks to form at least one electrical circuit within said walkway with the ends of the circuit positioned adjacent the periphery of said walkway for connection to a power source.

6. The walkway of claim 5 wherein each of said bricks is generally parallelpiped to have a substantially rectangular top and bottom, substantially rectangular opposed ends and substantially rectangular opposed sides, and wherein each of said bricks has two of said heating elements embedded therein, said heating elements being in substantially spaced parallel relationship relative to each other with one end portion of each heating element being exposed on one side of said brick and with the other end portion of each heating element being exposed on the opposing side of said brick, one of said male coupling means being mounted to the one end of each of said heating elements and one of said female coupling means being mounted to the other end of each of said heating elements.

7. The walkway of claim 6 wherein said bricks are positioned in substantial longitudinal and lateral alignment to form a jack-on-jack pattern, and wherein said coupling means of each brick are substantially aligned with and directly coupled to said coupling means of adjacent bricks to define a plurality of said electrical circuits within said walkway.

8. The walkway of claim 7 wherein the spaces between adjacent bricks are filled with mortar and wherein said coupling means are embedded within the mortar.

9. The walkway of claim 6 wherein each of said bricks is longitudinally offset relative to adjacent bricks to form a running bond pattern, and wherein each of said male coupling means is aligned with and coupled to a female coupling means of an adjacent brick defining a plurality of electrical circuits within said walkway.

10. The walkway of claim 9 wherein the spaces between adjacent bricks are filled with mortar and wherein said coupling means are embedded within the mortar.

11. The walkway of claim 6 and further including a plurality of extension cables each comprising an elongated electrical conductor having first and second end portions to which male coupling means and female coupling means are respectively mounted, and wherein said bricks are arranged in a herringbone pattern with their non-aligned coupling means electrically connected together by said extension cables to define at least one meandering electrical circuit within the walkway.

12. The walkway of claim 11 wherein the spaces between adjacent bricks are filled with mortar and wherein the coupling means and the extension cables are encapsulated within the mortar.

13. The walkway of claim 6 wherein each of said male coupling means includes a tongue and wherein each of said female coupling means defines a slot sized and shaped to receive said tongue.

* * * * *